United States Patent [19]

Nyssen

[11] 4,220,181

[45] Sep. 2, 1980

[54] MULTI-LAYER PIPE WITH SINGLE CORRUGATION IN INNER WALL

[76] Inventor: James Nyssen, 10045 Kenswood Dr., Chilliwack, British Columbia, Canada

[21] Appl. No.: 25,201

[22] Filed: Mar. 29, 1979

Related U.S. Application Data

[63] Continuation-in-part of Ser. No. 867,140, Jan. 5, 1978, abandoned.

[51] Int. Cl.² .......................... F16L 9/06; F16L 9/18
[52] U.S. Cl. ............................. 138/154; 138/135; 138/150; 138/122
[58] Field of Search ............... 138/122, 135, 150, 154, 138/173

[56] References Cited

U.S. PATENT DOCUMENTS

| 3,340,901 | 9/1967 | Lombardi | 138/173 |
| 4,108,212 | 8/1978 | Anderson et al. | 138/154 X |
| 4,129,152 | 12/1978 | Davis | 138/154 |

Primary Examiner—Charles E. Phillips
Attorney, Agent, or Firm—Lee & Smith

[57] ABSTRACT

A multi-layer, spirally wound tube or pipe product with a substantially smooth inner wall having a single, helical corrugation and a corrugated exterior wall. The pipe has an inner pipe layer consisting of an elongated sheet of flat material curled into adjacent, helical convolutions and an outer pipe layer consisting of an elongated sheet of corrugated material curled into adjacent, helical convolutions about the inner pipe layer. The inner and outer pipe layers share a common helical seam. A single, continuous helical corrugation is located in the inner pipe layer along the helical seam, thereby causing the seam to be located within the single corrugation.

7 Claims, 3 Drawing Figures

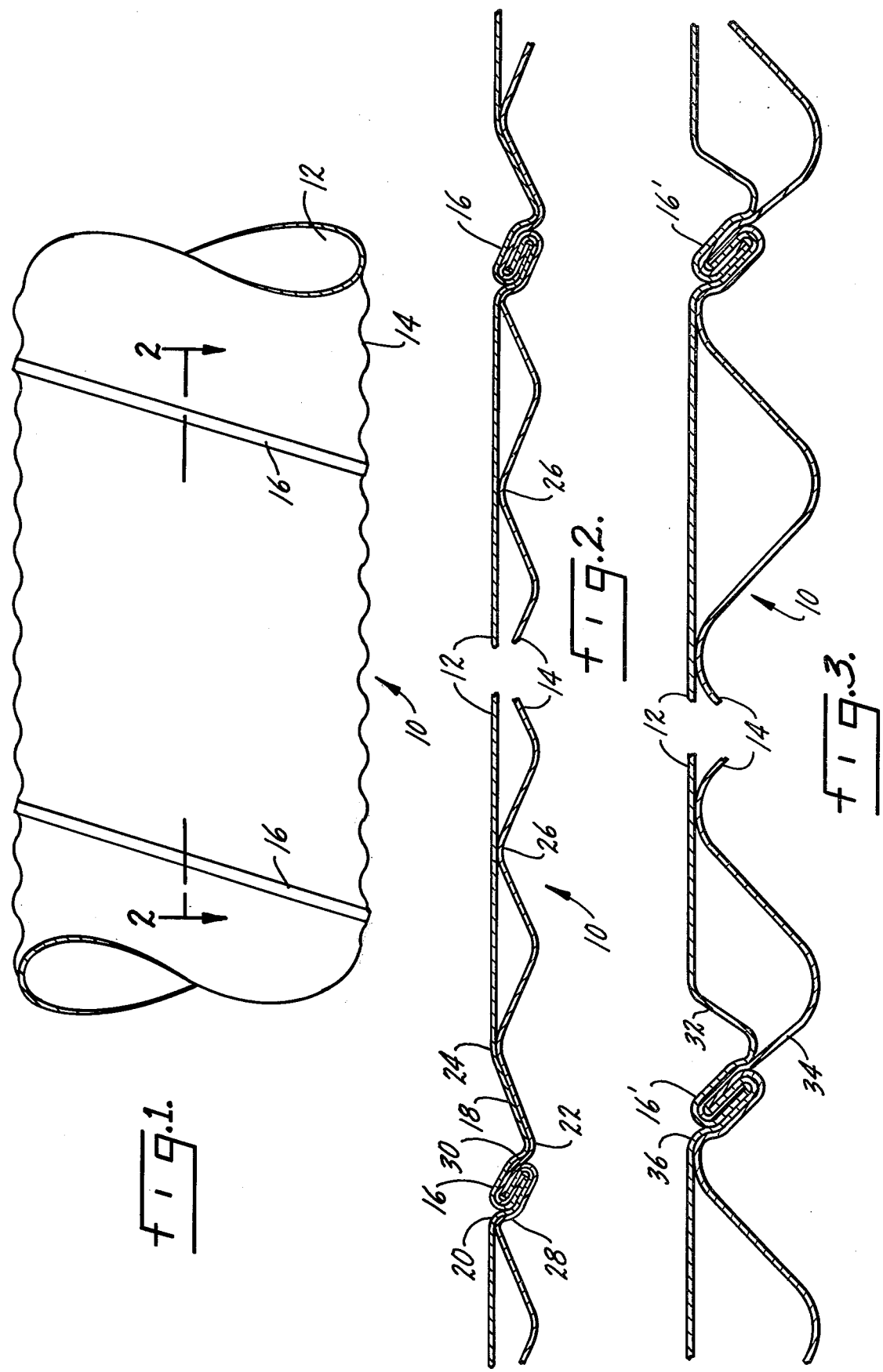

MULTI-LAYER PIPE WITH SINGLE CORRUGATION IN INNER WALL

SUMMARY OF THE INVENTION

Related Application

This application is a continuation-in-part of U.S. patent application Ser. No. 867,140, filed Jan. 5, 1978 and now abandoned.

THE BACKGROUND

This invention relates to spirally wound pipe products, and more particularly to a helical pipe having two or more pipe wall thicknesses, the inner wall of the pipe being generally smooth and the outer wall of the pipe being corrugated.

It is well known to form spiral pipe from an elongated sheet of metal or other ductile material. Such pipe products are illustrated, for example, in U.S. Pat. Nos. 1,179,577; 2,337,374; 3,106,177 and 3,132,616. Multi-layer spiral pipe is illustrated in U.S. Pat. No. 3,340,901.

In the conventional apparatus for producing a helical pipe product, an elongated sheet of metal is impressed with longitudinal corrugations and then spiralled into adjacent, helical convolutions which are joined either by welding or by formation of a continuous lock seam. One apparatus for forming a spirally wound pipe product is illustrated in the applicant's U.S. Pat. No. 4,070,886 entitled "Spiral Pipe Forming Machine With Device For Aligning Spiralling Rolls".

Many pipe products of the prior art, although exhibiting sufficient load bearing capacity to be used as a drainage culvert for highways and the like, suffer the disadvantage of having a non-smooth inner wall. For example, helically corrugated pipe produced by the apparatus of the applicant's above-identified patent or Freeze U.S. Pat. No. 2,136,943 has helical corrugations in the inner wall as well. The result of a non-smooth inner wall is inhibition to flow of liquids through the pipe, forcing the pipe user to select a larger diameter pipe than would be needed were the wall of the pipe smooth.

The prior art has recognized that the strength of a corrugated pipe in combination with a smooth inner wall is a favorable material combination. For example, Lombardi U.S. Pat. No. 3,340,901 has disclosed a pipe product formed from at least two layers of metal including a corrugated pipe outer shell and a smooth pipe inner shell.

However, prior art pipe of this nature generally suffers the disadvantage of having a relatively weak juncture of adjacent convolutions of the pipe shell. Stressive forces inherent in a spirally wound pipe and experienced by a spirally wound pipe when buried beneath the earth tend to weaken the seam of the Lombardi pipe, requiring the pipe maker to employ greater thickness pipe material than otherwise would be necessary in order to obtain sufficient strength for the pipe seam.

THE INVENTION

The above disadvantages of the prior art and others are overcome by the present invention which provides a multi-layer, spirally wound pipe having a smooth inner wall and corrugated outer wall which has a single corrugation in the inner wall of the pipe in which the helical seam of adjacent pipe convolutions is located.

The pipe is formed from at least two elongated sheets of ductile material, such as galvanized sheet metal, which are curled into adjacent, helical convolutions.

An inner pipe layer consists of a smooth sheet of material curled into adjacent, helical convolutions and has a single, continuous helical corrugation located in the inner wall having the same helix angle as the helical convolutions of the inner pipe layer. An outer pipe layer is formed from an elongated sheet of corrugated material which is curled into adjacent, helical convolutions joined together in a helical seam and formed about the inner pipe layer.

Preferably, and in order to obtain a sufficiently strong helical seam, the helical seams of the inner and outer pipe convolutions are formed as a common double lock seam located within the single corrugation in the inner pipe layer convolutions. The lock seam is normally located on a neutral axis of the single corrugation in order to reduce to a minimum the stressive forces which tend to cause the pipe to unravel or weaken along the lock seam.

With the lock seam located in the single helical convolution, it is located beneath the "sight-line" of the inner surface of the pipe, out of the path of liquids which may flow through the pipe. Additionally, the lock seam fills a portion of the inner corrugation, thereby reducing the turbulent flow which would otherwise be expected from an inner corrugation in the pipe.

The distance between adjacent convolutions of the inner corrugation varies depending on the width of the elongated sheets used to manufacture the pipe. The wall of the pipe between such corrugation convolutions is normally smooth, so that the inner pipe wall presents a generally smooth surface to liquids and reduces turbulent flow characteristics to the least possible minimum.

BRIEF DESCRIPTION OF THE DRAWING

The invention will be described in greater detail with reference to the drawing, in which:

FIG. 1 is a schematic representation of a portion of a pipe product according to the invention, FIG. 2 is an enlarged broken section taken along lines 2—2 of FIG. 1, and FIG. 3 is a broken section of a modification of the pipe shown in FIG. 2.

DETAILED DESCRIPTION OF THE INVENTION

Turning now to the drawing, a tube or pipe according to the invention is generally designated 10. The pipe illustrated is composed of a pair of elongated sheets of ductile material, such as galvanized steel, which are formed into adjacent, helical convolutions. As illustrated, the inner wall of the pipe is formed from a generally flat sheet 12, while the outer wall of the pipe is composed of a corrugated sheet 14. Adjacent convolutions of the sheets 12 and 14 are joined in a common double lock seam 16.

In a first embodiment of the invention, as shown in greater detail in FIG. 2, the inner wall of the pipe 10 is generally smooth along the surface of the sheet 12, excepting a single helical corrugation 18 formed in the pipe at the juncture of adjacent helical convolutions. The lock seam 16 is formed on a neutral axis of the single corrugation 18, that portion of the corrugation between a hill 20 and a valley 22. If desired, and although not illustrated, the lock seam 16 can as easily be located between the valley 22 and a second hill 24 of the corrugation 18, so long as the lock seam 16 is located on the neutral axis.

The purpose of the single corrugation 18 is to assure that the lock seam 16 is located on a neutral axis. When the pipe 10 is buried in use, stressive forces act along a line running between the hill 20 and valley 22, tending to compress or extend the lock seam 16 at its strongest point, across the folded-over portions of the lock seam. Were the single corrugation 18 omitted and the lock seam 16 formed along the inner surface of the flat sheet 12, stressive forces would tend to bow the seam 16, helping cause failure of the pipe 10 along the seam.

As further illustrated in FIG. 2, all portions of the sheet 12 between adjacent convolutions of the corrugation 18 are generally flat, and rest upon hills 26 of the corrugated sheet 14. Therefore, the inner surface of the pipe 10, with the exception of the single corrugation 18, is smooth.

The lock seam 16 is formed as illustrated with a heel 28 and a heel 30 located adjacent opposite ends of the seam 16 to strengthen the seam. Also, as illustrated, the material of the seam 16, although below the "sight-line" of the inner surface of the pipe 10, occupies and fills a portion of the corrugation 18. Therefore, the seam 16 aids in reducing turbulent flow characteristics caused by provision of the single corrugation 18 in an otherwise smooth inner wall of the pipe 10.

FIG. 3 illustrates a second embodiment of the invention modified somewhat from that shown in FIG. 2 and being particularly useful for pipe having deep corrugations in the outer wall, such as that having corrugations on the order of one inch deep, which consequentially have a large neutral axis. As shown in FIG. 3, the inner wall of the pipe 10 is composed of curled convolutions of a sheet 12 which is generally smooth with the exception of a single helical corrugation 32 formed in the inner wall at the juncture of adjacent helical convolutions. In this embodiment of the invention, the single helical corrugation 32 is not fully coextensive with the external corrugation 34 of the corrugated sheet 14 forming the outer wall of the pipe in which the corrugation 32 is located.

As shown, a common double lock seam 16' joins adjacent convolutions of the sheets 12 and 14. In this embodiment, due to the depth of the external corrugation 34, and due to the relatively shallow depth of the single corrugation 32, the lock seam 16', while formed on a neutral axis of both the single corrugation 32 and the external corrugation 34, is adjacent a common hill 38 shared by the corrugations 32 and 34. Hence, the neutral axis of the corrugation 32 in which the seam 16' is located is coextensive with a portion of the neutral axis of the corrugation 34 of the outer layer which shares the seam 16'. The remaining portions of the corrugation 32 are located within but not coextensive with the corrugation 34. The result is a single corrugation 32 in the inner wall of the pipe 10 having approximately the same depth as the single corrugation 18 shown in FIG. 2, but the outer wall of the pipe having a deeper corrugation profile for added strength and rigidity.

In the same manner as shown in FIG. 2, the material of the lock seam 16' is below the "sight line" of the inner surface of the pipe 10. Since the seam occupies and fills a portion of the single corrugation 32, the seam aids in reducing turbulent flow characteristics caused by the provision of the single corrugation 32 in an otherwise smooth inner wall of the pipe 10.

It should be recognized that although the neutral axis of the corrugation 32, opposite the neutral axis in which the seam 16' is located, is shown to be of the same general pitch as that in which the seam is located, the pitch of the opposite neutral axis can be substantially steepened, and even vertical or greater, so long as the common seam 16' remains located on a neutral axis of both the corrugations 32 and 34. Thus, the pitch of the right-hand portion of the corrugation 32 (as shown in FIG. 3) may be changed from that shown without altering pipe strength, but with the possible benefit of reduced turbulent flow through the pipe 10.

By providing a relatively shallow single corrugation 32 in the inner wall of the pipe 10 with the outer wall of the pipe having substantially deeper external corrugations, turbulent flow characteristics caused by the provision of the single corrugation 32 are reduced to a minimum, yet the strength of the pipe is not at all compromised from that shown in FIG. 2, since the lock seam 16' is located on a neutral axis, and therefore stressive forces act along the common neutral axis shared by the corrugations 32 and 34, tending to compress or extend the lock seam 16' at its strongest point, along the folded-over portions of the seam.

One method for construction of the pipe 10 is described in the applicant's co-pending U.S. patent application Ser. No. 867,139, entitled "Method and Apparatus For Making Multi-Layer Spiral Pipe", filed on Jan. 5, 1978, and which is incorporated herein by reference. The pipe 10 may be made by first impressing corrugations in a flat sheet of material to form the corrugated sheet 14, laying the flat sheet 12 upon the corrugated sheet 14, and then forming portions of the single corrugation 18 (or 32) in opposite marginal edges of the multi-layer sheet. At the same time, portions of the seam 16 may be formed in the sheet along the portions of the corrugation 18.

After the layered sheets are suitably prepared, the sheets are curled into adjacent, helical convolutions and lock seam portions interengaged and formation of the double lock seam 16 completed. The pipe is then cut to desired lengths by a suitable severance mechanism. Preferably, and as illustrated in the applicant's U.S. Pat. No. 3,815,455, severance of succeeding pipe sections is accompanied by a flying saw.

Changes may be made to the foregoing multi-layer pipe without departing from the spirit thereof. For example, the lock seam 16 may be omitted and a welded seam formed in its place along a neutral axis of the corrugation 18. The scope of the invention is defined by the following claims.

I claim:

1. A mutil-layer, spirally wound pipe with a substantially smooth interior wall having a single, helical corrugation in the inner wall and a corrugated exterior wall, comprising a. an inner pipe layer consisting of an elongated sheet of material curled into adjacent, helical convolutions, said inner pipe layer convolutions being joined by a helical seam, b. a single, continuous helical corrugation located in said inner pipe layer having the same helix angle as said helical convolutions, said helical seam being located within said single corrugation on a neutral axis of said single corrugation, c. an outer pipe layer consisting of an elongated sheet of corrugated material curled into adjacent, helical convolutions about said inner pipe layer, said outer pipe layer convolutions being joined by a helical seam, said seam being located on a neutral axis of a corrugation of said outer pipe layer, d. the helix angle of the helical convolutions of said outer pipe layer being substantially the same as the helix angle of said single corrugation, e. said neutral axis of said single corrugation having said helical seam being coextensive with at least a portion of a neutral axis of one of the corrugations of said outer pipe layer and said single corrugation lying within one of the corrugations of the outer pipe layer thereby locating the helical seam of inner pipe layer within said one corrugation of the outer pipe layer, and f. means joining said inner and outer pipe layers.

2. A pipe according to claim 1 in which the pitch and depth of said single corrugation are essentially the same as the pitch and depth of the corrugations of said outer pipe layer, thereby forming a concurrent unitary corrugation of said single corrugation and said one corrugation.

3. A pipe according to claim 1 in which the helical seam of said inner pipe layer convolutions is a lock seam.

4. A pipe according to claim 1 in which said inner and outer pipe layer convolutions are joined by a common helical seam.

5. A pipe according to claim 4 in which said common helical seam is a double lock seam.

6. A pipe according to claim 4 in which said common helical seam comprises said joining means.

7. A pipe according to claim 1 in which said inner and outer layers are joined at said coextensive neutral axes.

* * * * *